United States Patent [19]

Sugai et al.

[11] Patent Number: 5,346,523
[45] Date of Patent: Sep. 13, 1994

[54] METHOD OF MOLDING CHALCOGENIDE GLASS LENSES

[75] Inventors: Masakatsu Sugai, Amagasaki; Yasuo Mizuno, Hirakata; Masaki Ikeda, Hirakata; Akihiko Yoshida, Hirakata, all of Japan

[73] Assignee: Matsushita Electric Industrial Co., Ltd., Osaka, Japan

[21] Appl. No.: 40,412

[22] Filed: Mar. 31, 1993

[30] Foreign Application Priority Data

Mar. 31, 1992 [JP] Japan .................................. 4-076490
Feb. 8, 1993 [JP] Japan .................................. 5-019803

[51] Int. Cl.5 ............................................. C03B 11/12
[52] U.S. Cl. ........................................ 65/102; 65/111;
65/DIG. 15; 65/275; 65/319
[58] Field of Search ............... 65/64, 102, 111, 68,
65/72, 76, 85, 104, 106, 108, 117, 144, 244, 275,
305, 355, 319, DIG. 15; 425/405.1, 406, 808,
DIG. 60, DIG. 110; 264/2.7, 1.1, 1.4

[56] References Cited

U.S. PATENT DOCUMENTS

| | | |
|---|---|---|
| 2,410,616 | 11/1946 | Webb . |
| 3,794,704 | 2/1974 | Strong . |
| 3,833,347 | 9/1974 | Angle et al. . |
| 3,900,328 | 8/1975 | Parsons et al. .......................... 65/68 |
| 4,139,677 | 2/1979 | Blair et al. . |
| 4,435,200 | 3/1984 | Joormann et al. ..................... 65/102 |
| 4,778,505 | 10/1988 | Hirota et al. .......................... 65/102 |
| 4,854,958 | 8/1989 | Marechal et al. ....................... 65/64 |
| 5,032,160 | 7/1991 | Murata et al. ......................... 65/102 |
| 5,173,100 | 12/1992 | Shigyo et al. .......................... 65/102 |
| 5,228,894 | 7/1993 | Sato et al. .............................. 65/102 |

FOREIGN PATENT DOCUMENTS 2-160631 6/1990 Japan ......................... 65/DIG. 15

Primary Examiner—W. Gary Jones
Assistant Examiner—Steven P. Griffin
Attorney, Agent, or Firm—Ratner & Prestia

[57] ABSTRACT

An infrared transmitting chalcogenide glass lens having precision optical surfaces of different curvature radii is molded. A pair of molds having different curvature radiuses from each other, and a bushing which controls the thickness of the lens is provided. A block of chalcogenide glass is placed within the cavity. The upper mold, the lower mold and the block of glass are heated with the mold having a smaller curvature radius being at a higher temperature than the other mold. The glass is then pressed, cooled, and the resulting lens is removed from the mold assembly.

4 Claims, 1 Drawing Sheet

METHOD OF MOLDING CHALCOGENIDE GLASS LENSES

FIELD OF THE INVENTION

The present invention relates to a method of molding an infrared beam transmitting chalcogenide glass lens.

BACKGROUND OF THE INVENTION

An infrared beam transmitting lens is generally produced by cutting, grinding and polishing a block of silicon single crystal.

On the other hand, a visible beam transmitting lens is produced through the steps of heating and pressing a preform of oxide glass by a molding apparatus. An exemplary molding apparatus which is suitable for this application is illustrated in FIG. 1. This apparatus is also described in U.S. Pat. No. 4,854,958 which is incorporated herein by reference. In the exemplary molding apparatus, a preform of oxide glass 1 is placed in a cavity which is surrounded by an upper mold 2, a lower mold 3 and a bushing 4. The optical surfaces 5 are fabricated in the ends of the molds. Heating is provided by means of an induction heating coil 6, the molds and the glass preform are brought to a temperature at which the glass exhibits a viscosity between $10^8$–$10^{12}$ poises, a load is applied to the molds by mold carriers 7 and 8, and the motion of the molds is defined by bushing 4 and frame 9. The temperature of the mold is monitored and controlled by thermocouple 10. In this case, the upper and the lower surfaces of the glass preform are heated to the same temperature and pressed.

Prior methods for producing infrared beam transmitting lenses have often required many processes and expensive hand work. Prior methods for producing visible beam transmitting lenses have often resulted in low production rates when chalcogenide glass lenses having precision optical surfaces of different curvature radii on its both sides have been formed. This is because the viscosity of chalcogenide glass falls more rapidly than that of oxide glass as its temperature increases.

SUMMARY OF THE INVENTION

A glass lens is molded by heating and pressing a block of chalcogenide glass with an appropriate apparatus. The apparatus is provided with a pair of molds having different curvature radiuses, and the temperature of the mold having a smaller curvature radius is set higher than that of the other mold.

In this manner, a spheric or aspheric infrared beam transmitting lens having a different curvature radii on each of its two ends and with high precision can be produced.

DETAILED DESCRIPTION

EMBODIMENT 1

The first exemplary embodiment of the present invention will be described referring to FIG. 2.

Figure 1:
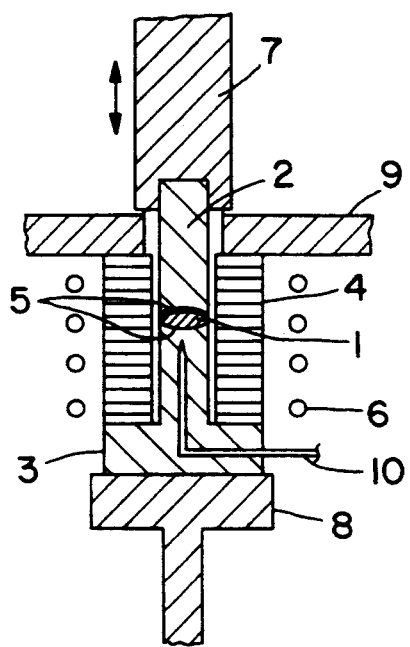
FIG. 1 depicts a sectional view of an apparatus suitable for molding an oxide glass in accordance with the prior art.
Figure 2:
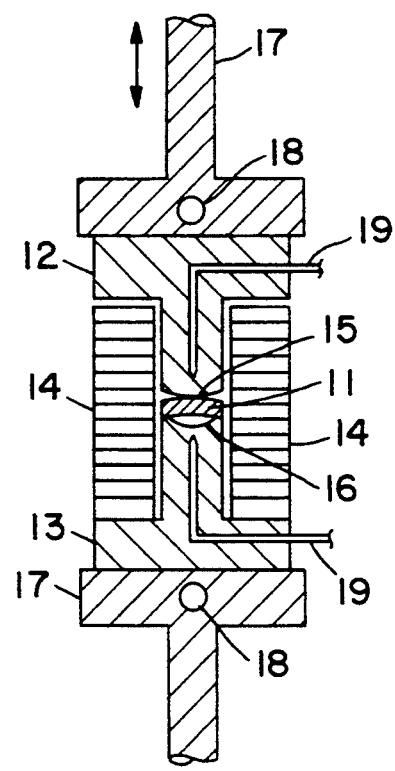
FIG. 2 represents a sectional view of an apparatus employed in a first exemplary embodiment of the present invention.

In FIG. 2, a chalcogenide glass disc 11 was placed within the cavity surrounded by a pair of molds, namely, an upper mold 12, and a lower mold 13, and a bushing 14 which defined the thickness of the glass lens.

An optical surface 15 fabricated in the end of the upper mold had a convex surface with a diameter of 7 mm, a curvature radius of 5 mm, and a surface roughness of less than 0.01 $\mu$m. An optical surface 16 fabricated in the end of the lower mold had a concave surface with a diameter of 7 mm, a curvature radius of 100 mm, and a surface roughness of less than 0.01 $\mu$m. Press cylinders 17 having heaters 18 were provided in the end of the molds to press the glass disc. Heaters 18 were adapted to heat molds 12 and 13 the temperatures of which were monitored and controlled by thermocouples 19. The glass which was used had a composition, in atomic weight percent, of 20% Ge, 80% Se. The softening temperature of the glass (i.e. where the glass exhibits a viscosity of $4.5 \times 10^7$ poise) was 240° C. In the apparatus of FIG. 2, the upper mold 12 was heated to 270° C., the lower mold 13 was heated to 250° C., and a load of 100 kg/cm² was applied to the molds for three minutes.

The mold assembly was cooled while still maintaining the load. Subsequently, the pressed lens was removed from the mold assembly and annealed.

The finished article was a meniscus chalcogenide glass lens having a surface roughness of less than 0.01 $\mu$m, a diameter of 7 mm, a thickness of 2.5 mm and curvature radii of 5 mm and 100 mm. Furthermore, there were no surface trapped bubbles.

EMBODIMENT 2

The second exemplary embodiment of the present invention will be described referring to FIG. 3.

Figure 3:
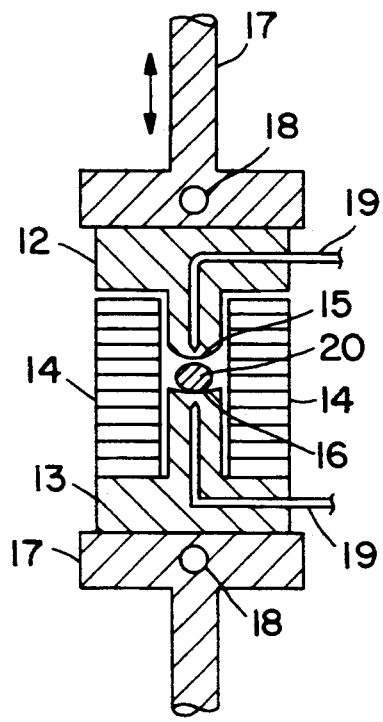
FIG. 3 represents a sectional view of an apparatus employed in a second exemplary embodiment of the present invention.

In FIG. 3, the softening temperature of glass gob 20 was 265° C. The glass which was used had a composition, in atomic weight percent, of 40% As and 60% Se. In the apparatus of FIG. 3, the upper mold 12 was heated to 295° C., the lower mold 13 was heated to 275° C., and a load of 100 kg/cm² was applied to the molds for three minutes. The mold assembly was cooled while still maintaining the load, and subsequently, the pressed lens was removed from the mold assembly and annealed.

The finished article was a meniscus chalcogenide glass lens having a surface roughness of less than 0.01 $\mu$m, a diameter of less than 7 mm, a thickness of 2.5 mm and curvature radii of 5 mm and 100 mm. Furthermore, there were no surface trapped bubbles. The molding method of the present embodiment required less processing than that of the first exemplary embodiment.

EMBODIMENT 3

The third exemplary embodiment of the present invention will be described referring to FIG. 4.

Figure 4:
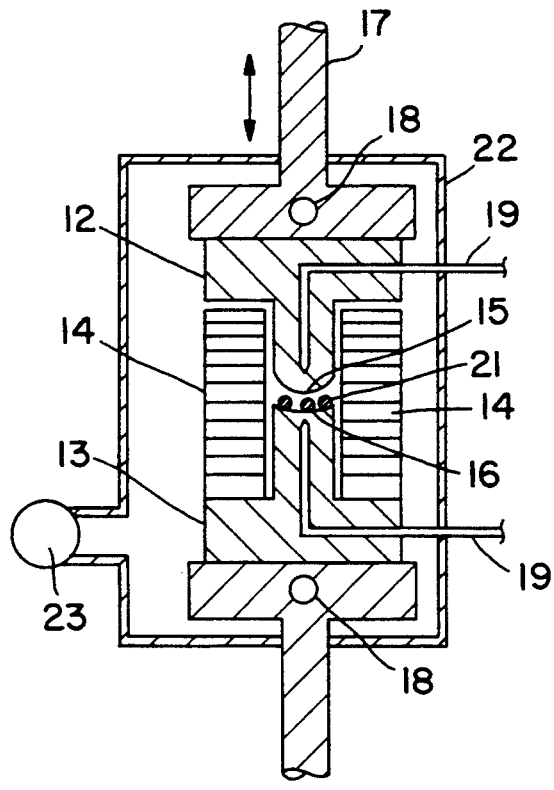
FIG. 4 represents a sectional view of an apparatus employed in a third exemplary embodiment of the present invention.

In FIG. 4, the softening temperature of three pieces of pulverized glass was 300° C. Furthermore, the composition of the glass was, in atomic weight percent, 10% Ge, 30% As, 60% Se. The molding assembly of the present exemplary embodiment was placed within a container 22, and the container was evacuated with vacuum pump 23. Furthermore, the upper optical surface was heated to 400° C, the lower optical surface was heated to 375° C., and a load of 100 kg/cm² was applied to the molds for three minutes. The mold assembly was cooled while still maintaining the load. Subsequently, the pressed lens was removed from the mold assembly and annealed.

The finished article was a meniscus chalcogenide glass lens having a surface roughness of less than 0.01 μm, a diameter of 7 mm, a thickness of 2.5 mm and curvature radii of 5 mm and 100 mm. Furthermore, there were no surface trapped bubbles. The molding method of the present embodiment required less processing than that of the second embodiment.

As observed above, desirable molding temperatures were 10°–100° C. higher than the softening temperature of the glass. It was observed that the molding time was undesirably long and the optical surface of the mold was not precisely transcribed to the glass when the molding was carried out at less than 10° C. higher than softening temperature. On the other hand, unwanted adhesion of glass to the mold or flow between clearances in the mold assembly occurred when the molding was carried out at a temperature more than 100° C. higher than softening temperature.

Articles similar to those obtained in accordance with the embodiments described above were obtained using glass having a composition in atomic weight percent of 30% Ge, 70% Se and a softening temperature of 390° C. or a composition in atomic weight percent of 30% Ge, 60% S, and 10% I and with a softening temperature of 505° C. Articles similar to the finished articles obtained with the embodiments set forth above relating to a spherical lens were also obtained in the form of aspherical lenses.

What is claimed:

1. A method of molding a chalcogenide glass lens, comprising the steps of:

providing a mold assembly having a mold cavity which includes a pair of molds having different curvature radiuses, placing a block of chalcogenide glass within said cavity, heating said pair of molds having different curvature radiuses from each other and said block of chalcogenide glass, in such manner that the temperature of the mold having smaller curvature radius is higher than the temperature of the other mold, pressing said block of chalcogenide glass to form a molded chalcogenide glass lens, and removing the molded chalcogenide glass lens from said mold assembly.

2. A method of molding a chalcogenide glass lens according to claim 1, wherein the temperatures of said pair of molds are 10°–100° C. higher than the softening temperature of said block of chalcogenide glass.

3. A method of molding a chalcogenide glass lens, comprising the steps of:

providing a mold assembly having a mold cavity which includes a pair of molds having different curvatures radiuses from each other placing a plurality of pulverized chalcogenide glass pieces within said mold cavity, placing said mold assembly within a container evacuating said container, heating said pair of molds having different curvature radiuses and said pulverized chalcogenide glass pieces in such manner that the temperature of the mold having the smaller curvature radius is higher than the temperature of the other mold, pressing said plurality of pulverized glass pieces to form the chalcogenide glass lens, and removing the chalcogenide glass lens from the mold assembly.

4. A method of molding a chalcogenide glass lens according to claim 3, wherein the temperatures of said pair of molds are 10°–100° C. higher than the softening temperature of said pieces of pulverized chalcogenide glass.

* * * * *

UNITED STATES PATENT AND TRADEMARK OFFICE
CERTIFICATE OF CORRECTION

PATENT NO.   : 5,346,523
DATED        : September 13, 1994
INVENTOR(S)  : Sugai et al.

It is certified that error appears in the above-identified patent and that said Letters Patent is hereby corrected as shown below:

Claim 1, Col. 4, line 9, after "having" insert --a--.

Signed and Sealed this

Fourteenth Day of February, 1995

Attest:

BRUCE LEHMAN

*Attesting Officer*  *Commissioner of Patents and Trademarks*